United States Patent
Fang et al.

(10) Patent No.: US 8,079,732 B2
(45) Date of Patent: Dec. 20, 2011

(54) ILLUMINATING DEVICE

(75) Inventors: Jui-Wen Fang, Miao-Li Hsien (TW);
Zheng-Jay Huang, Miao-Li Hsien (TW);
Shao-Fu Hsu, Miao-Li Hsien (TW);
Shu-Hui Hsieh, Miao-Li Hsien (TW);
Chih-Ming Lai, Miao-Li Hsien (TW)

(73) Assignee: Foxsemicon Integrated Technology, Inc, Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/489,371

(22) Filed: Jun. 22, 2009

(65) Prior Publication Data
US 2010/0033967 A1    Feb. 11, 2010

(30) Foreign Application Priority Data
Aug. 8, 2008    (CN) .......................... 2008 1 0303608

(51) Int. Cl.
*F21V 7/04* (2006.01)
(52) U.S. Cl. .................. 362/249.02; 362/632; 362/633; 362/634; 362/613
(58) Field of Classification Search .................. 362/613, 362/612, 632–634; 349/69–71
See application file for complete search history.

(56) References Cited

U.S. PATENT DOCUMENTS

| | | | | |
|---|---|---|---|---|
| 7,125,137 B2* | 10/2006 | Kitajima et al. | ............... | 362/153 |
| 7,333,163 B2* | 2/2008 | Huang et al. | .................... | 349/58 |
| 7,367,708 B2* | 5/2008 | Hsieh | ............................ | 362/634 |
| 7,473,022 B2* | 1/2009 | Yoo | ............................... | 362/621 |

FOREIGN PATENT DOCUMENTS

CN    2292291 Y    9/1998

* cited by examiner

*Primary Examiner* — Anabel M Ton
(74) *Attorney, Agent, or Firm* — Altis Law Group, Inc.

(57) ABSTRACT

An illuminating device includes a receiving base and at least one light source. The receiving base has at least one receiving space defined therein, and at least one fixing post is positioned adjacent to the corresponding at least one receiving space. The at least one light source is positioned in the at least one receiving space for emitting light. Each light source comprises a light-pervious plate and a LED array located on a side of the light-pervious plate. The light-pervious plate comprises at least one first through hole with the at least one fixing post extending therethrough, the light-pervious plate is fixed to the receiving base in the corresponding receiving space of the receiving base.

12 Claims, 2 Drawing Sheets

ILLUMINATING DEVICE

BACKGROUND

1. Technical Field

The disclosure generally relates to illuminating devices, and particularly to an illuminating device with replaceable light sources.

2. Description of Related Art

Light emitting diodes have been widely used in illumination devices to substitute for conventional cold cathode fluorescent lamps (CCFL) due to their high brightness, long life-span, and wide color gamut. Relevant subject matter is disclosed in an article entitled "Solid State Lighting: Toward Superior Illumination", published in a magazine Proceedings of the IEEE, Vol. 93, No. 10, by Michael S. Shur et al. in October, 2005, the disclosure of which is incorporated herein by reference.

A typical illuminating device, such as advertising panel, generally includes LEDs and a holding base. The holding base comprises a front plate and a rear plate. The rear plate has a receiving space defined therein for receiving the LEDs. The rear plate is fittingly fixed on the front plate to fix the LEDs onto the holding base. However, it is difficult to remove the LEDs from the holding base once they are assembled together, so that it is necessary to replace both the LEDs and the holding base when the LEDs no longer work.

What is needed, therefore, is an improved illuminating device which can overcome the above shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
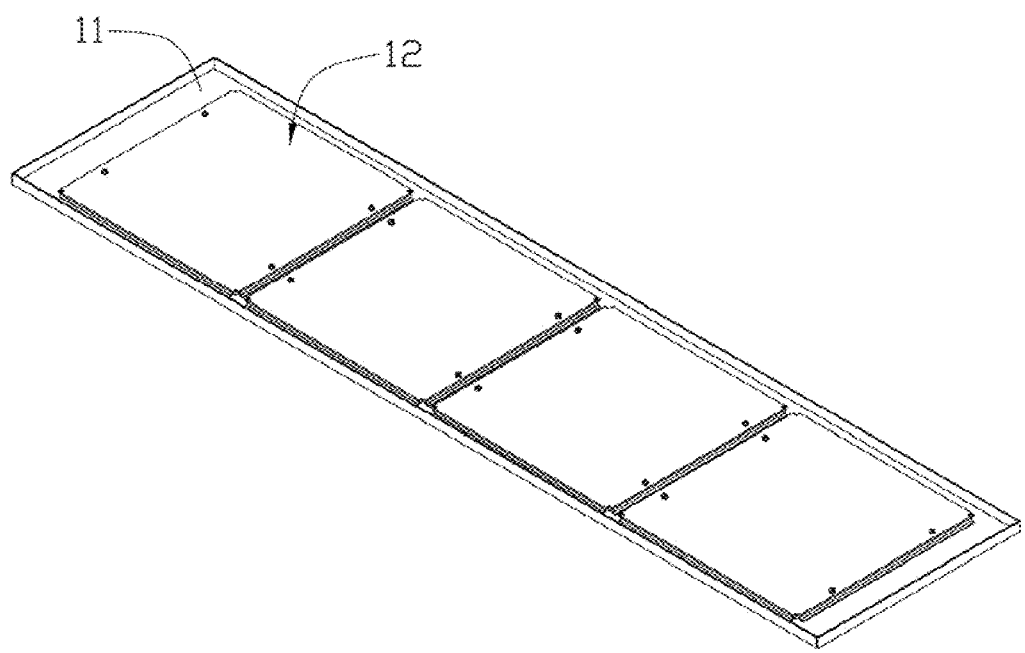
FIG. 1 is an isometric view of an exemplary embodiment of an illuminating device.

Referring to FIG. 1, an exemplary embodiment of an illuminating device 10 includes a receiving base 11 and a plurality of light sources 12. In the illustrated embodiment, the illuminating device 10 includes four light sources 12, for example.

Figure 2:
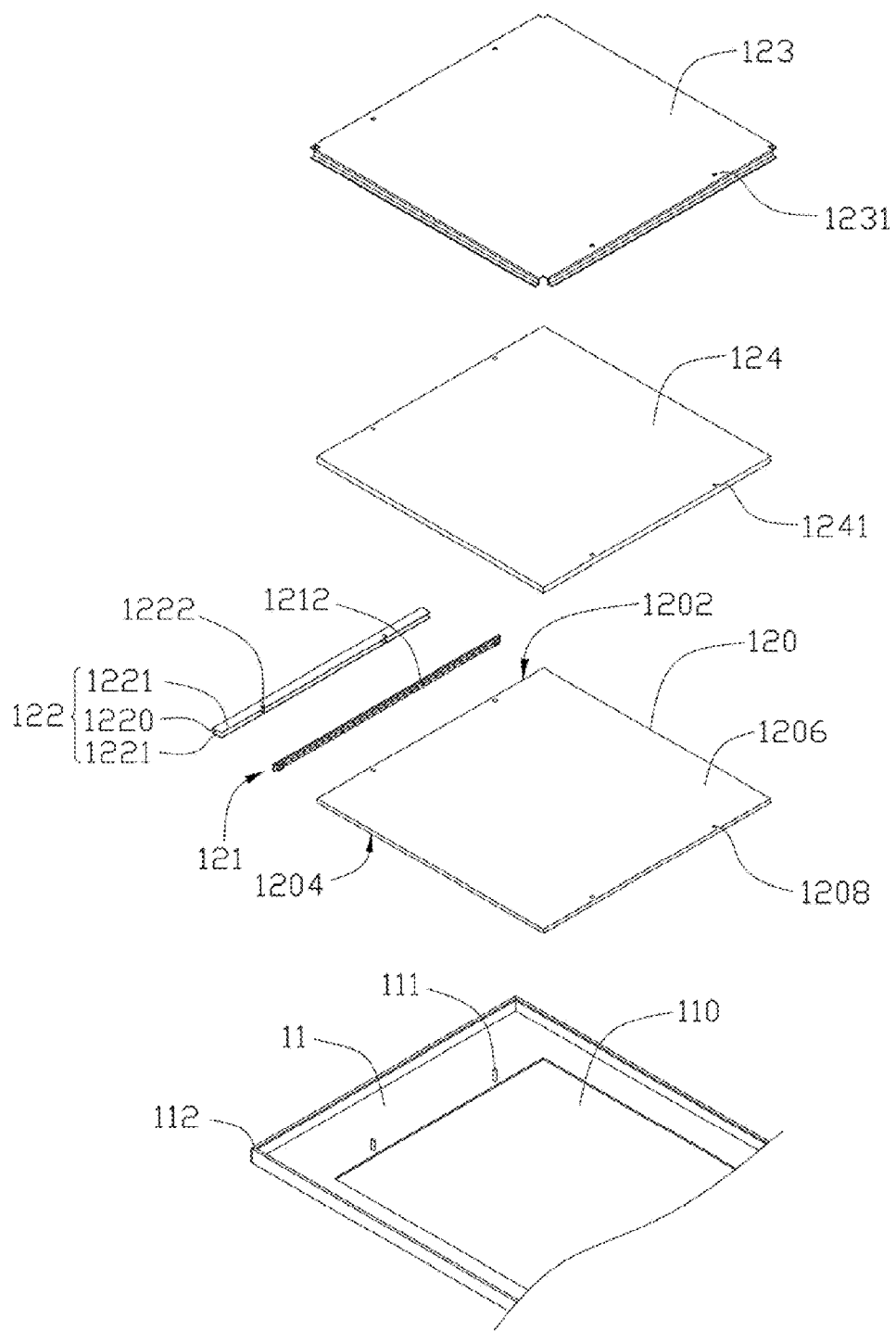
FIG. 2 is a disassembled, schematic view of the illuminating device of FIG. 1.

Referring to FIG. 2, the receiving base 11 is flat, and has four receiving spaces 110 defined therein in an array, to receive the four light sources 12 therein respectively. At least one fixing post 111 is positioned adjacent to the corresponding receiving spaces 110. In addition, a flange 112 is formed at an edge of the receiving base 11 for enhancing strength of the receiving base 11.

Each light source 12 includes a light-pervious plate 120, a light emitting diode (LED) array 121, an array holder 122, and a rear plate 123.

The light-pervious plate 120 has a light incident surface 1202, a light emitting surface 1204 adjoining the light incident surface 1202, and a back surface 1206 opposite to the light incident surface 1202. The LED array 121 is located opposite to the light incident surface 1202 of the light-pervious plate 120, for emitting light into the light-pervious plate 120 through the light incident surface 1202.

At least one first through hole 1208 is defined in the closest region and/or the farthest region of the light-pervious plate 120 relative to the LED array 121. In the illustrated embodiment, the light-pervious plate 120 has four first through holes 1208, two of them are positioned on the light-pervious plate 120 adjacent to the LED array 121, and the other two are located on the light-pervious plate 120 away the LED array 121. All of the four first through holes 1208 extend from the light emitting surface 1204 to the back surface 1206 and respectively with the fixing posts 111 of the receiving base 11 extending therethrough, the light-pervious plate 120 is fixed to the corresponding receiving space 110.

The light emitting surface 1204 of the light-pervious plate 120 may include a plurality of depressions or projections formed thereon, so that light emitted from the light emitting surface 1204 can be scattered effectively, and glare avoided. A material of the light-pervious plate 120 is selected from polymethylmethacrylate, poly carbonate, silicone, epoxy and polycrylate or glass. A plurality of microstructures may be formed on the light emitting surface 1204 by mechanical grinding, impression, injection molding etc.

The light-pervious plate 120 may include a plurality of scattering particles therein. The scattering particles can be made of $TiO_2$, $SiO_2$, $SiN_x$, $CaF_2$, $BaSO_4$, $ZnO$, $B_2O_3$, $Nb_2O_5$, $Na_2O$, $Li_2O$, or other suitable materials. The scattering particles are configured for scattering the light emitting from the LED array 121, to improve the uniformity of light output by the illuminating device 10. Alternatively, the light-pervious plate 120 may include a plurality of defects or pores formed therein by electromagnetic waves, to scatter the light emitting from the LED array 121.

A reflective layer 124 may be placed on the back surface 1206 of the light-pervious plate 120, to reflect the light incident on the reflective layer 124, to improve light utilization efficiency of the illuminating device 10. At least one second-through hole 1241 is defined in the reflective layer 124, for extension of the fixing posts 111 of the receiving base 11 therethrough, the reflective layer 124 is fixed to the corresponding light-pervious plate 120.

The LED array 121 includes a plurality of light emitting diodes 1212 in a linear fashion, which is located opposite to the light incident surface 1202 of the light-pervious plate 120.

In the illustrated embodiment, the array holder 122 has a U-shaped profile, and includes a spine 1220 and two support walls 1221 extending from opposite edges of the spine 1220 in a same direction. The LED array 121 is placed between the two support walls 1221 and contacts the spine 1220. The support walls 1221 are attached to the light-pervious plate 120. At least one third-through hole 1222 is defined in each support walls 1221 for extension of the fixing posts 111 therethrough and fixing the array holder 122 into the corresponding receiving space 110, such that the LED array 121 can be fixed to face the light incident surface 1202 of the light-pervious plate 120. The array holder 122 may be made of spring steel, plastic, or other elastic materials.

The rear plate 123 is located opposite to the back surface 1206 of the light-pervious plate 120, and the reflective layer 124 is placed between the rear plate 123 and the back surface 1206 of the light-pervious plate 120. The rear plate 123 covers the LED array 121 and the back surface 1206 of the light-pervious plate 120, to protect the whole light source 12. A plurality of fourth through holes 1231 is defined in the rear plate 123 for extension of the fixing posts 111 of the receiving base 11 therethrough, the rear plate 123 is fixed to the corresponding receiving spaces 110.

In the present embodiment, the four light sources 12 are respectively placed in the four receiving spaces 110 of the receiving base 11; the fourth through holes 1231 of the rear plate 123, the third through holes 1222 of the array holder 122, the second-through holes 1241 of the reflective layer 124, and the first through hole 1208 of the light-pervious plate 120 of each light source 12 are respectively with the fixing posts 111 of the receiving base 11 extending therethrough, so that every light source 12 can be fixed on the receiving base 11 independently. Once one of the light sources 12 needs to be checked or serviced, taking this one of the light sources 12 down from the illuminating device 10 is enough, less infection for the other light sources 12 can be avoided. In addition, one end of the fixing posts 111 may have screw thread thereon and matching a screw cap, the light sources 12 can be fixed on the receiving base 11 tightly.

It can be understood that, the light source 12 may includes a plurality of LED array 121 respectively opposite to surfaces of light-pervious plate 120 between the light emitting surface 1204 and the back surface 1206, thus brightness of the light source 12 can be improved. The receiving base 11 may includes one receiving spaces 110 for receiving one light source 12. The arrangement of the receiving spaces 110 is not limited to above embodiment, the receiving spaces 110 may be arranged in other continued fashion.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An illuminating device comprising:
a receiving base having at least one receiving space defined therein, and at least one fixing post being positioned adjacent to the at least one receiving space; and
at least one light source positioned in the at least one receiving space for emitting light, the at least one light source comprising a light-pervious plate and a LED array located on a side of the light-pervious plate, the light-pervious plate comprising at least one first through hole with the at least one fixing post extending therethrough, the light-pervious plate being fixed to the receiving base in the the at least one receiving space.

2. The illuminating device of claim 1, wherein the receiving base is flat, and a flange is formed at an edge of the receiving base.

3. The illuminating device of claim 1, wherein the light-pervious plate has a light incident surface, a light emitting surface adjoining the light incident surface, and a back surface opposite to the light incident surface, the LED array is located opposite to the light incident surface of the light-pervious plate, light emitted from the LED array entering into the light-pervious plate through the light incident surface.

4. The illuminating device of claim 3, wherein the light emitting surface includes a plurality of depressions or projections formed thereon.

5. The illuminating device of claim 3, wherein the at least one light source further comprises a reflective layer placed on the back surface of the light-pervious plate, and at least one second through hole is defined in the reflective layer for extension of the at least one fixing post therethrough.

6. The illuminating device of claim 3, wherein the at least one light source further comprises a rear plate located opposite to the back surface of the light-pervious plate, and a plurality of third through holes are defined in the rear plate for extension of the at least one fixing post therethrough.

7. The illuminating device of claim 1, wherein the at least one light source further comprises an array holder, the LED array is fixed on the light-pervious plate via the array holder.

8. The illuminating device of claim 7, wherein the array holder has a U-shaped profile.

9. The illuminating device of claim 7, wherein the array holder includes a spine and two support walls extending from opposite edges of the spine in a same direction, the support walls attached to the light-pervious plate and at least one fourth through hole defined in each support wall for extension of the at least one fixing post therethrough.

10. The illuminating device of claim 1, wherein the light-pervious plate comprises a plurality of scattering particles therein.

11. The illuminating device of claim 1, wherein one end of the at least one fixing post has a screw thread thereon.

12. An illuminating device comprising:
a receiving base defining a plurality spaces therethrough and forming a flange extending upwardly from an edge of the receiving base and a plurality of fixing posts extending upwardly from the receiving base and located adjacent to the receiving spaces;
a plurality of light sources positioned in the spaces for emitting light through the spaces, each light source comprising a light-pervious plate and a LED array located on a side of the light-pervious plate, the light-pervious plate including a plurality of through holes with corresponding ones of the plurality of fixing posts extending therethrough, the light-pervious plates being fixed to the receiving base in the receiving spaces, respectively.

* * * * *